United States Patent
Bell et al.

(10) Patent No.: US 10,929,603 B2
(45) Date of Patent: *Feb. 23, 2021

(54) CONTEXT-BASED TEXT AUTO COMPLETION

(71) Applicant: International Business Machines Corporation, Armonk, NY (US)

(72) Inventors: David R. Bell, Southampton (GB); Peter J. Cullen, Hampshire (GB); John W. Duffell, London (GB); Darren J. Sullivan, Portsmouth (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 157 days.

This patent is subject to a terminal disclaimer.

(21) Appl. No.: 15/982,196

(22) Filed: May 17, 2018

(65) Prior Publication Data

US 2018/0267953 A1 Sep. 20, 2018

Related U.S. Application Data (63) Continuation of application No. 14/805,610, filed on Jul. 22, 2015, now Pat. No. 10,031,907.

(30) Foreign Application Priority Data

Jul. 28, 2014 (GB) ..................... 1413332

(51) Int. Cl.
*G06F 16/00* (2019.01)
*G06F 40/274* (2020.01)
*G06F 16/2457* (2019.01)

(52) U.S. Cl.
CPC ...... *G06F 40/274* (2020.01); *G06F 16/24578* (2019.01)

(58) Field of Classification Search
CPC ............... G06F 16/24578; G06F 16/00; G06F 17/3053; G06F 17/30985; G06F 17/276;
(Continued)

(56) References Cited

U.S. PATENT DOCUMENTS 5,845,300 A 12/1998 Comer et al.
5,896,321 A 4/1999 Miller et al.
(Continued)

FOREIGN PATENT DOCUMENTS

WO 2014089524 A1 6/2014

OTHER PUBLICATIONS

UK International Search Report for Application No. GB1413332.6 dated Jan. 22, 2015, 4 pages.
(Continued)

*Primary Examiner* — Anh Ly
(74) *Attorney, Agent, or Firm* — Cantor Colburn LLP; Alexander Jochym (57) ABSTRACT

An aspect of auto-completion of text entered by a user includes configurable data collection components that collect from software applications text data and metadata representing an initial state of each of the applications and text data and metadata representing changes to the state of one or more of the applications. A central text matching component receives and stores the text data and metadata. A sending component sends text entered by the user in a text-entry field and any metadata associated with it to the central text matching component. A comparison component compares the entered text and associated metadata to the stored text data and metadata and locates matching text strings. A weighted ordering component ranks the matching text strings using the metadata and its configuration settings.
(Continued)

A completion component completes the entered text at the text-entry field based on a selection of one of the located matching text strings.

20 Claims, 5 Drawing Sheets (58) Field of Classification Search
CPC .. G06F 17/0237; G06F 17/30; G06F 17/3071;
G06F 17/30675; G06F 17/3064; G06F
17/30864; G06F 17/30528; G06F 17/241;
G06F 17/24; G06F 17/2735; G06F
17/30392; G06F 40/274; G06F 3/0237
See application file for complete search history.

(56) References Cited

U.S. PATENT DOCUMENTS

| | | | |
|---|---|---|---|
| 6,377,965 B1 | 4/2002 | Hachamovitch et al. | |
| 6,820,075 B2 | 11/2004 | Shanahan et al. | |
| 7,685,144 B1* | 3/2010 | Katragadda | G06F 40/274 |
| | | | 707/999.101 |
| 7,698,127 B2 | 4/2010 | Trower, II et al. | |
| 8,112,529 B2 | 2/2012 | Van Den Oord et al. | |
| 8,359,532 B2* | 1/2013 | Chen | G06F 40/274 |
| | | | 715/259 |
| 8,484,208 B1 | 7/2013 | Raghavan et al. | |
| 9,323,866 B1 | 4/2016 | Duddu et al. | |
| 9,448,772 B2 | 9/2016 | Gulwani et al. | |
| 9,576,074 B2 | 2/2017 | Kuo et al. | |
| 9,710,836 B1 | 7/2017 | O'Malley | |
| 2002/0143828 A1 | 10/2002 | Montero et al. | |
| 2003/0033288 A1* | 2/2003 | Shanahan | G06F 16/3344 |
| 2003/0135507 A1 | 7/2003 | Hind et al. | |
| 2008/0155565 A1 | 6/2008 | Poduri | |
| 2008/0195388 A1* | 8/2008 | Bower | G06F 3/0237 |
| | | | 704/243 |
| 2008/0243736 A1 | 10/2008 | Rieman et al. | |
| 2008/0243738 A1* | 10/2008 | Rieman | G06F 15/16 |
| | | | 706/18 |
| 2008/0294982 A1 | 11/2008 | Leung et al. | |
| 2009/0182741 A1 | 7/2009 | Chen et al. | |
| 2010/0115424 A1 | 5/2010 | Young et al. | |
| 2010/0229157 A1 | 9/2010 | Ergan et al. | |
| 2010/0235730 A1 | 9/2010 | Campbell et al. | |
| 2011/0106841 A1 | 5/2011 | Cao et al. | |
| 2011/0137896 A1* | 6/2011 | Masunaga | G06F 40/274 |
| | | | 707/723 |
| 2011/0202876 A1 | 8/2011 | Badger et al. | |
| 2012/0158751 A1 | 6/2012 | Tseng | |
| 2012/0221571 A1* | 8/2012 | Orman | G06F 16/90324 |
| | | | 707/737 |
| 2012/0296627 A1 | 11/2012 | Suzuki et al. | |
| 2013/0117185 A1* | 5/2013 | Collison | G06Q 20/4097 |
| | | | 705/67 |
| 2013/0218899 A1* | 8/2013 | Raghavan | G06F 16/156 |
| | | | 707/741 |
| 2014/0012568 A1 | 1/2014 | Caskey et al. | |
| 2014/0136543 A1* | 5/2014 | Frieden | G06F 16/90324 |
| | | | 707/741 |
| 2014/0142926 A1 | 5/2014 | Jones et al. | |
| 2014/0163953 A1 | 6/2014 | Parikh | |
| 2014/0163954 A1* | 6/2014 | Joshi | G06F 3/0237 |
| | | | 704/9 |
| 2014/0164093 A1 | 6/2014 | Libman | |
| 2014/0172417 A1 | 6/2014 | Monk, II et al. | |
| 2014/0181788 A1 | 6/2014 | Sullivan et al. | |
| 2014/0278349 A1 | 9/2014 | Grieves et al. | |
| 2014/0280289 A1 | 9/2014 | Marantz et al. | |
| 2015/0030212 A1 | 1/2015 | Cavanagh et al. | |
| 2015/0100537 A1 | 4/2015 | Grieves et al. | |
| 2015/0154269 A1 | 6/2015 | Miller et al. | |
| 2015/0309966 A1 | 10/2015 | Gupta et al. | |
| 2015/0310005 A1* | 10/2015 | Ryger | G06F 16/93 |
| | | | 707/706 |
| 2015/0319509 A1* | 11/2015 | Huang | H04N 21/4722 |
| | | | 725/53 |
| 2015/0332672 A1 | 11/2015 | Akbacak et al. | |
| 2016/0026639 A1* | 1/2016 | Bell | G06F 16/24578 |
| | | | 707/749 |
| 2016/0049010 A1 | 2/2016 | Hinski | |
| 2016/0260433 A1 | 9/2016 | Sumner et al. | |
| 2019/0361792 A1* | 11/2019 | Goldberg | G06F 11/3664 |

OTHER PUBLICATIONS

List of IBM Patents or Patent Applications Treated as Related; Date Filed: May 17, 2018, 2 pages.

Agrawal, N. "Auto Complete Using Graph Mining: A Different Approach"; Abstract Only, retrieved at: http://ieeexplore.ieee.org/xpl/login.jsp?tp=&arnumber=5752947&url=http%3A%2F%2Fieeexplore.ieee.org%2Fxpls%2Fabs_all.jsp%3Farnumber%3D5752947; Southeastcon, 20111 Proceedings of IEEE, Date of Conference Mar. 17-20, 2011; pp. 268-271.

Hyvonen, Eero et al. "Semantic Autocompletion", Abstract Only, retrieved at: http://link.springer.com/chapter/10.1007/11836025_72; The Semantic Web—ASWC 2006, Lecture Notes in Computer Science vol. 4185, 2006, pp. 739-751.

Kastrinakis, Dimitrios et al. "Advancing Search Query Autocompletion Services with More and Better Suggestions"; Abstract Only, retrieved at: http://link.springer.com/chapter/10.1007/978-3-642-13911-6_3; Web Engineering, Lecture Notes in Computer Science vol. 6189, 2010, pp. 35-49.

* cited by examiner

CONTEXT-BASED TEXT AUTO COMPLETION

DOMESTIC AND FOREIGN PRIORITY

This application is a continuation of U.S. patent application U.S. Ser. No. 14/805,610 filed Jul. 22, 2015 which claims priority to United Kingdom Application No. 1413332.6, filed Jul. 28, 2014, and all the benefits accruing therefrom under 35 U.S.C. § 119, the combined contents of which in its entirety are herein incorporated by reference.

BACKGROUND

The present disclosure relates generally to suggestive text auto-completion and, more particularly, to supplying text auto-completion suggestions to a user of a text entry application.

It is known to provide an auto-completion or type-ahead function to assist a user in text entry. This is used, for example, in a computing environment in which a user enters text in to a text entry field of a document viewed on a display, using a text entry device such as a keyboard. An autocomplete or type-ahead function is provided by presenting on the display one or more suggested completions to text already entered by the user. The suggested completions are provided by matching text, usually text having the same initial letters as entered by the user, by using a dictionary of words or phrases. Various advances on this basic pattern have been suggested.

U.S. Pat. No. 7,685,144 describes techniques for automatically generating and maintaining personal data, such as an address book, a financial portfolio, a discussion groups or blogs book, or other types of personal data stores, based on a person's structured search data and/or usage data (e.g., browsing) and/or other sources of personal data (e.g., emails the user receives). Related metadata can also be used in the generating and/or maintaining of the personal data. Dynamic personal data ranking and/or autocomplete functions are also provided, which can be used in conjunction with the automatic generation and maintenance of the user's personal data, to further ease the user's burden in managing and/or handling such data.

U.S. Pat. No. 8,359,532 describes methods and arrangements of text entry. Embodiments include transformations, code, state machines or other logic to index segments of text from multiple sources and receive segments of text being entered into text-entry applications in a floating application. The embodiments may also involve matching the segments of text to indexed segments of text and entering completions of the received segments of text into the text-entry applications. The completions may be based upon the matching, and the completion of a segment may be entered into the text-entry application from which it was received.

SUMMARY

According to an embodiment, there is provided a system for supplying and weighted ordering of completion text for auto-completion of text entered by a user in a software application text entry operation. The system includes a memory and a computer processor. The computer processor includes configurable data collection components for collecting from a plurality of software applications text data and text metadata representing an initial state of each of the software applications and text data and text metadata representing changes to the state of at least one of the plurality of software applications. The computer processor also includes a central text matching component for receiving from the data collection components the text data and text metadata representing an initial state and the text data and text metadata representing changes to the state of at least one of the plurality of software applications. A database of the text data and text metadata and the change text data and text metadata is maintained in the memory by the central text matching component. The computer processor also includes a sending component that sends text entered by the user in a text-entry field of an application and any text metadata associated with the entered text to the central text matching component, a comparison component that compares the entered text and associated text metadata to text data and text metadata in the database and locates text strings matching the text data and metadata, and a weighted ordering component that ranks the matching text strings using the text metadata and its configuration settings. The computer processor also includes a completion component that completes the entered text at the text-entry field based on a selection of one of the located matching text strings, and an updating component that updates text metadata of the matching text string in the database to reflect the selection and updates the configuration settings of the weighted ordering component based on the updated text metadata.

A method and computer program product is also provided herein in accordance with embodiments.

BRIEF DESCRIPTION OF THE DRAWINGS

Embodiments of the present invention will now be described, by way of example only, with reference to the following drawings in which.

DETAILED DESCRIPTION

Figure 1:
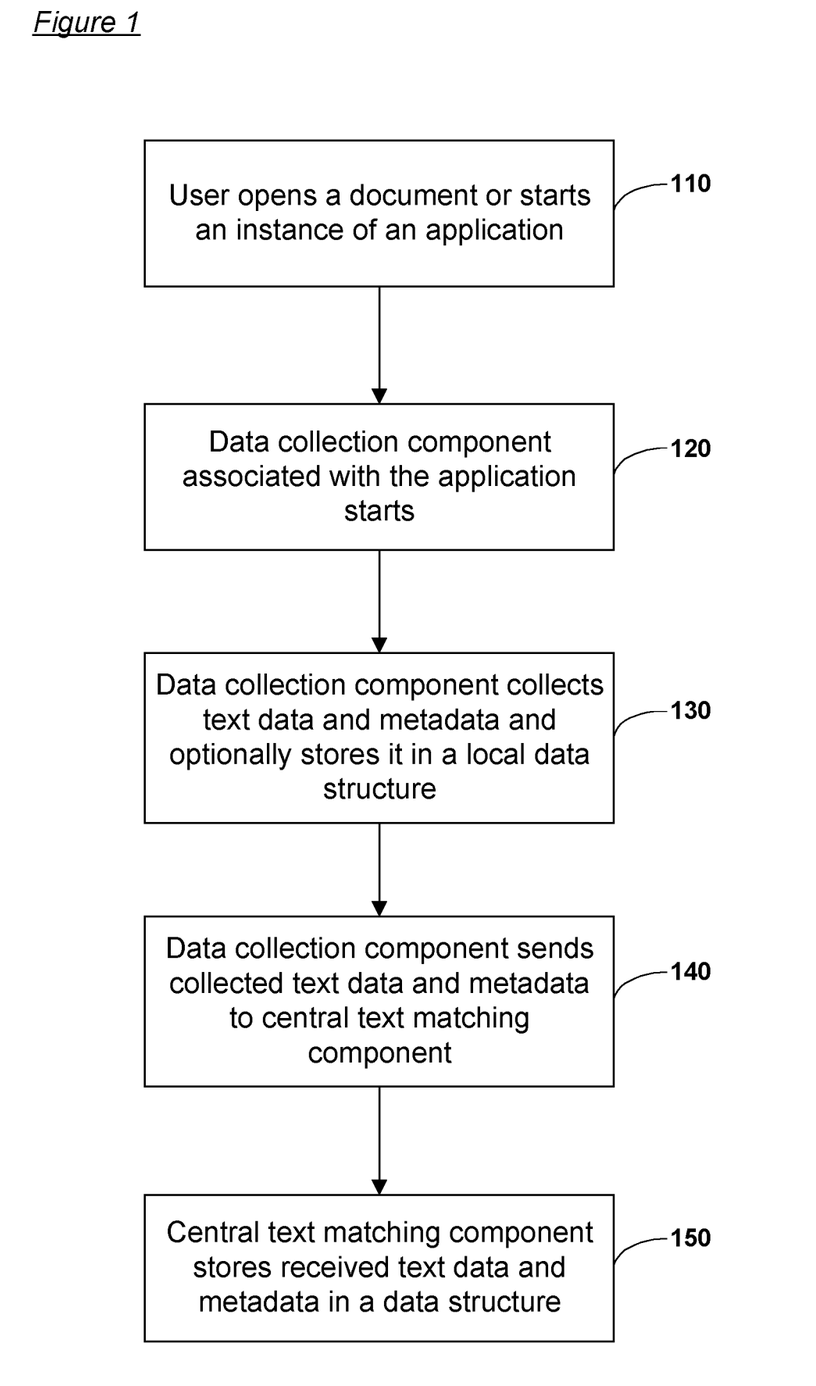
FIG. 1 is a flowchart illustrating a data collection process according to an embodiment.

FIG. 1 is a flowchart illustrating the process of collection of data for use in a text auto-completion system according to an embodiment of the present invention. The process operates in the context of a user operating any known data processing system, for example comprising a central data processing unit and data input and output devices and optionally being network connected. The process of data collection commences at block 110 when a user opens a document as part of a running software application, or otherwise carries out an action to open an instance of a software application involving text entry, or text display from a pre-existing document, for example a document loaded from the Internet and displayed in a Web browser application.

In an embodiment, this action causes a data collection component associated with the application to be initiated at block 120. The data collection component may comprise, for example, a software plugin to the application, or may be an integral part of the application. The data collection component is configurable to collect text data entered by the user at block 130. The collection may comprise recording letter by letter as the text is entered or by recording at timed intervals text entered since the last collection. In typical operation according to the embodiment all text entered is collected by the data collection component. The text collection may comprise recording the collected text in a data structure local to the data collection component.

In an embodiment, the data collection component is further configurable to collect at block 130 text data from a pre-existing document opened by a user. In one embodiment a document is displayed to a user by, for example, a Web browser application. When a user enters an identifier of a document or Webpage, for example a URL (Uniform Resource Locator), or selects a document link in a Webpage document already displayed in a Web browser, the document associated with the identifier or link is loaded and displayed by the Web browser. The data collection component collects the text of the displayed document.

In an embodiment, the data collection component is further configurable to collect text metadata relating to displayed text at block 130. This text metadata may comprise data describing, for example, the displaying application, the position of text within a document, the size of the font used for display, the fact that the text is in a title or an abstract, or that it is in bold or underlined, or the time the text was created or last edited. The metadata collecting may comprise recording the collected metadata in a data structure local to the data collection component.

In an embodiment, the amount and types of text data and text metadata collected by the data collection component for a particular application may vary depending on the type or the identity of the application. For example, all available text data and text metadata might be collected for a text editing application, but for a music playing application where text output is limited, only the text of the titles of played music tracks. In one embodiment the text data and text metadata collected for a particular application is configurable. In one embodiment the type and amount of text data and text metadata collected is configurable by a user. The configuration may be by the input of data collection settings which are then applied by the data collection component. In one embodiment the text data and text metadata collected is configurable by feedback of information relating to selections made by a user and as described below with reference to FIGS. 2 and 3.

The collected text data and metadata may then be sent by the data collection component to a central text matching component at block 140. The central text matching component comprises an application which receives text data and text metadata from all application data collection components of a user. The use of the term "central" is not intended to imply a physical location, but to describe its functional location in the system. In one embodiment, the sending may comprise sending text data and text metadata at intervals corresponding to as it is collected. Alternatively in an embodiment the sending may comprise sending of text data and text metadata relating to a complete document. For example, after the display to a user of a Webpage, the Webpage text data and text metadata may be sent to the central text matching component as a single file. Each application will therefore provide an indication of its initial state which comprises the text and associated text metadata of the displayed document, and any state changes with text data and associated text metadata, to the central text matching component.

At block 150 the text data and text metadata is received by the central text matching component and stored by the component in a data structure. The data structure may comprise a data structure searchable by a database search engine of the central text matching component. A person skilled in the art will understand that different data structure types and database search engines are known and that any appropriate data structure, or more than one data structure, and any suitable database search engine may be used to perform this function.

In an embodiment, during normal operation of a data processing device comprising the data collection process described with reference to FIG. 1, text data and metadata relating to all documents or any text structures written to, read by and edited by the user in a plurality of software applications may be collected by data collection components associated with each software application and sent to the central text matching component. The central text matching component may build therefrom a central database with associated data structures storing the text data and text metadata collected from the various documents and software applications processed by the user.

It will be understood that in some embodiments the central text matching component may also collect text data and text metadata associated with documents and software applications in use by other users. Such other users may be, for example, work colleagues of the user, and in an example text data and text metadata collected from all the members of a project team may be supplied to a user's central text matching component. In one embodiment a single central text matching component may service a plurality of individual users.

The central text matching component may comprise processing logic for parsing and indexing received text data and text metadata. The processed text may be stored in data structures of its database. It may index individual words and/or phrases or larger blocks of text. Associated with these text entries will be the text metadata identified by the data collection components.

Figure 2:
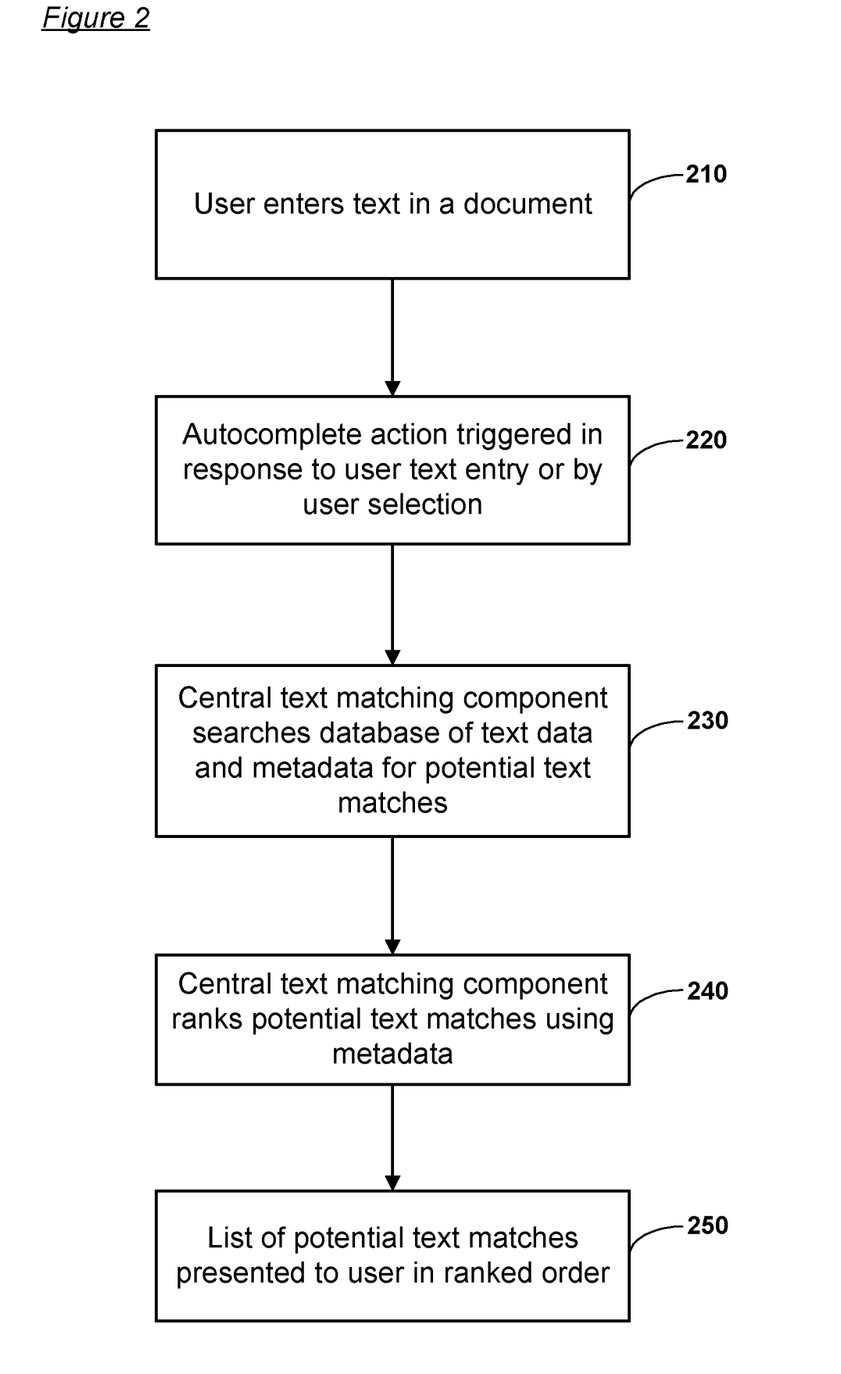
FIG. 2 is a flowchart illustrating a process of providing auto-completion suggestions according to an embodiment.

FIG. 2 is a flowchart illustrating the process of providing suggestions for auto-completion according to an embodiment of the present invention. At block 210 a user begins to enter text in to a text entry field in a document displayed to the user. This document may be a pre-existing textual document (for example a word processor or other text editing application document) opened for editing, a newly created textual document, or a document with identifiable text entry fields.

At block 220 the supply and display of suggestions for auto-completion of text entered by a user is triggered. In one embodiment this is a process which is triggered in documents opened in certain applications in response to a user entering an alphanumeric character using a text entry user input device such as a keyboard. In one embodiment the process is triggered after a set number of characters have been entered, for example after two consecutive characters have been entered. Alternatively the process may be triggered by user selection, which may be, for example, by user selection of a keyboard shortcut such as by pressing an individual key or a combination of keys, or by selection from a menu displayed after using a keyboard or right mouse button selection action.

At block 230 the central text matching component begins the matching process to locate potential matches to the entered text string. This may be by matching the entered text string against words, phrases or larger blocks of text stored in its central database. It may also take into account the metadata arising from the context of the text entered for matching, and communicated with it, to identify matching metadata in the database.

By maintaining a central text matching component database as in the described embodiments, a list of suggested completions for partial text entry from a number of source documents and applications may be provided quickly and efficiently.

At block 240 a weighted ordering component of the central text matching component uses the comparison of the entered text and potential text matches to rank the potential text matches for presentation to the user. This might be, for example, by comparison of text metadata associated with the context of the text entered for matching with the text data and text metadata of potential matches to identify those potential matches with most similarity of text data and text metadata. Different weightings may be applied to different types of text metadata to provide a tool for ranking potential matches, for example to produce a composite rank value for each potential match. It will be apparent to those skilled in the art that any suitable mechanism for ranking potential matches may be used without departing from the scope of the invention.

In one embodiment the mechanism for ranking potential matches is user configurable so that the user may choose which factors are taken into account for ranking potential matches, and the relative importance of each factor. In one embodiment, the ranking takes into account the similarity of the current text entry document and application to the document and application supplying the text data and metadata, so that matches from the same or similar sources to the entered text are ranked more highly.

At block 250 the ranked potential matches are presented to the user. This might be by opening a text box beside the text entry point on the display screen containing the ranked list of potential matches, or by any other suitable means. In one embodiment, this might be by opening a new window containing a ranked list of potential matches for selection by the user. This option might be particularly appropriate if the potential matches comprise large blocks of text.

After presentation of potential matches to the user according to this embodiment or in any other appropriate way, the user may select one of the alternative suggestions by a selecting action, for example by positioning an on-screen cursor and selecting by clicking a mouse button, or by pressing an appropriate keyboard key. The text of the selected match is then inserted in the text entry field of the user document at the current editing position.

In one embodiment, text matching is configured to select the highest ranked possible match and insert it without further user action. In one embodiment, text matching is configured to select the highest ranked possible match if it exceeds a threshold of degree of similarity to entered text and insert it without further user action.

Figure 3:
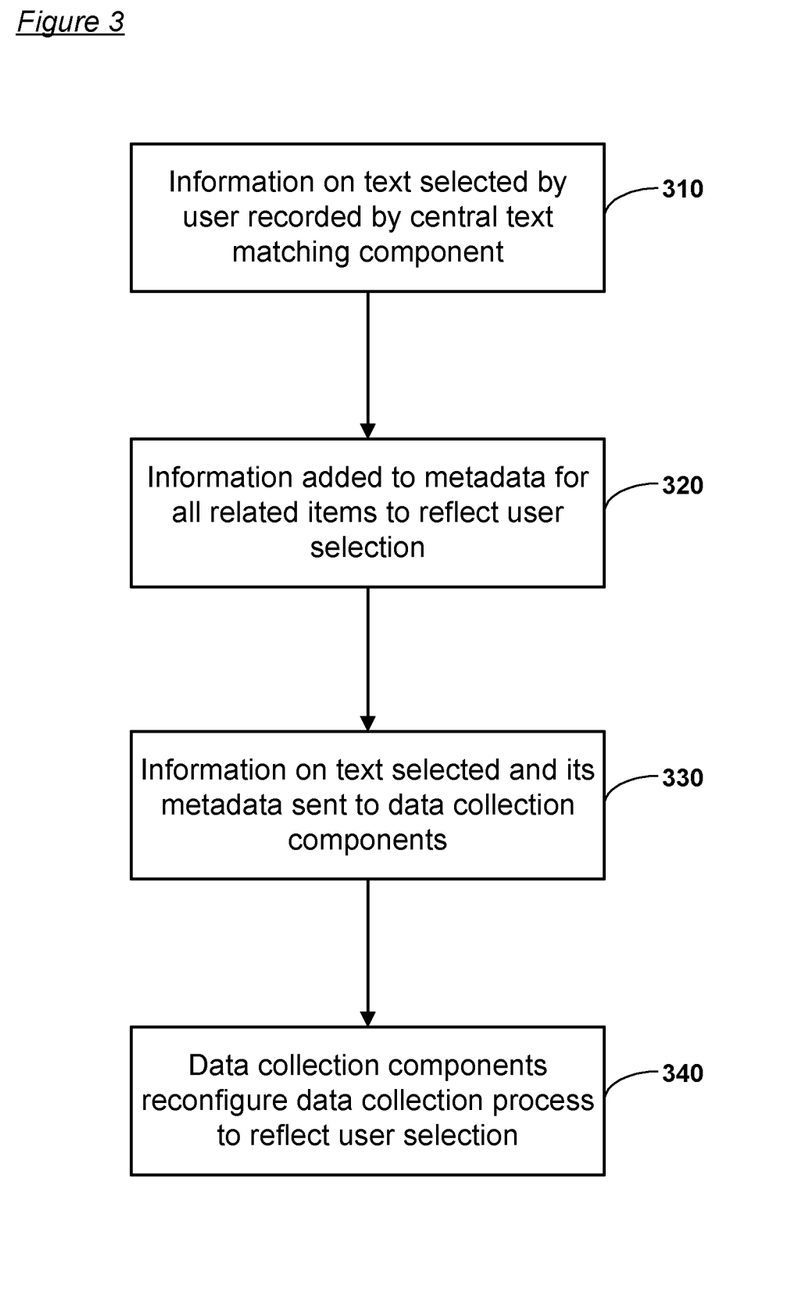
FIG. 3 is a flowchart illustrating refining of a matching process according to an embodiment.

FIG. 3 illustrates refining of the matching process according to an embodiment of the invention. In an embodiment, the refining comprises configuration of matching settings in the central text matching component based on information relating to the text selected by a user for auto-completion. In another embodiment, the refining comprises feedback of information relating to the text selected by a user to a data collection component of an application from which the selected text originated. In another embodiment, the refining comprises feedback of information relating to the text selected by a user to data collection components of other applications in addition to that from which the selected text originated.

At block 310, identifying information of the text selected by a user from the ranked list of potential matches for the text auto-completion operation is recorded by the central text matching component, together with its associated text metadata.

At block 320, the central text matching component adds identifying information denoting this user selection to the text metadata for all related text entries in its database. In an embodiment this includes adding the information to all items from the same source document and application. In another embodiment this includes adding the information to items of the same type from the source document or application. For example, if the selection is from a table of data items, the information is added to all other items from the same table. In one embodiment this is used in the text matching process to ensure a higher ranking for text from the same source in future.

At block 330, the central text matching component sends information on the text selected by the user and its associated text metadata to the data collection component of the application which originally provided the selected text. In an embodiment, the information is the same as that added to records in the central text matching component data structure. The text metadata may include, for example, the identity of the document from which the text originated, and the part of the document it came from. In another embodiment, information on the text selected by the user and its associated text metadata is sent to the data collection components of application other than that which originally provided the selected text.

At block 340, the data collection component of the application receiving the feedback uses the information to configure its text collection process so that future data collection will be adjusted to take account of the user selection. In one embodiment the data collection component may have been configured by the user to collect only text data of the same type as that selected in recent auto-completion actions. In this case the data collection component will use, for example, the information that tabular data was used from this source for auto-completion to collect only tabular data, or to increase the frequency of data collection from tabular data.

Figure 4:
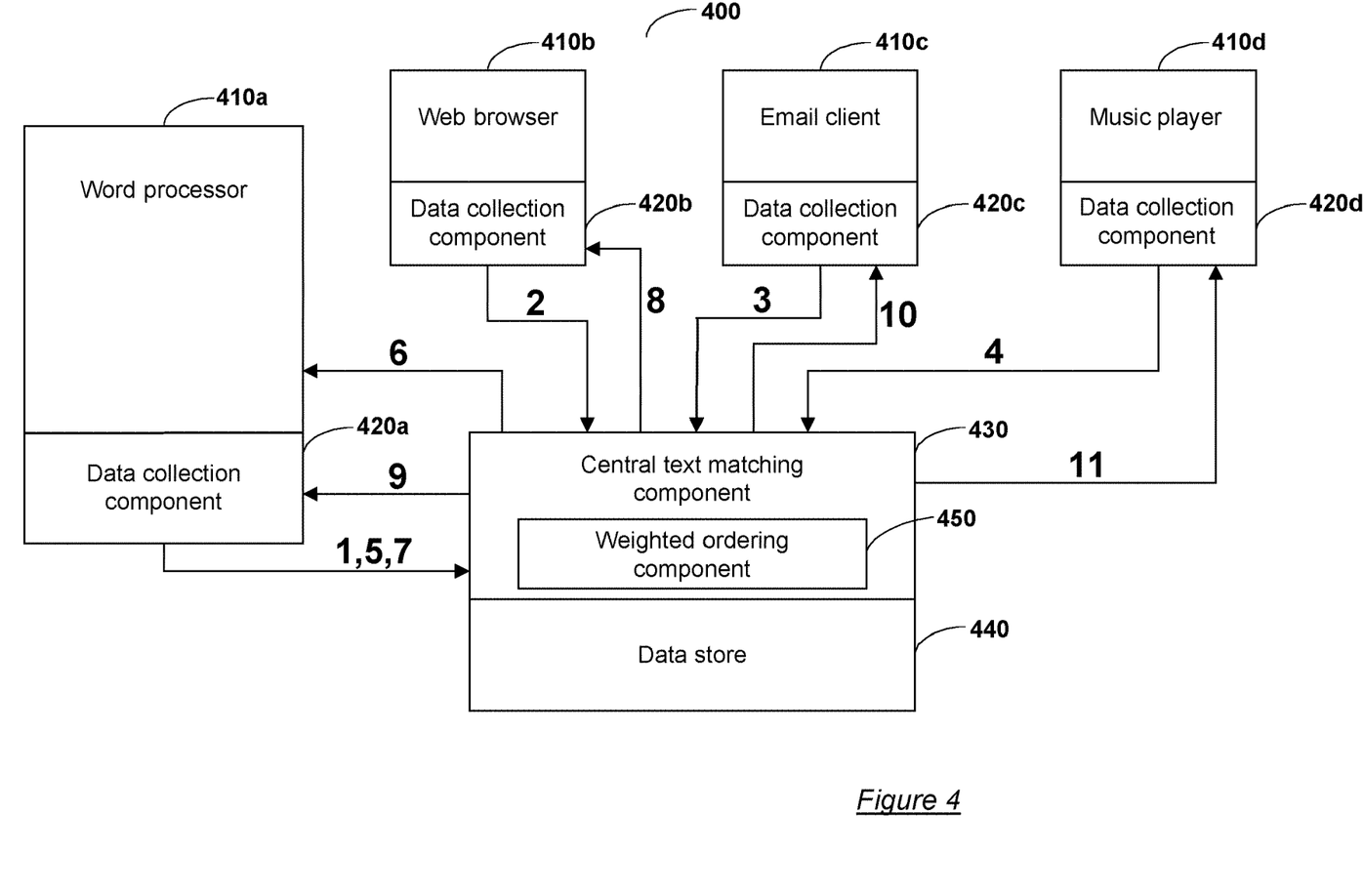
FIG. 4 illustrates operation of a process of data collection, text matching for auto-completion, and refinement of the matching process, according to an embodiment.

FIG. 4 illustrates the operation of the process of data collection, text matching for auto-completion, and refinement of the matching process, according to embodiments of the present invention.

In auto-completion process 400, a user opens or has opened a number of applications. In the example illustrated, the applications are word processor 410*a*, Web browser 410*b*, email client application 410*c* and music player 410*d*. When each application is initiated by the user, the system also starts a data collection component specific to that application, data collection components 420*a* to 420*d* respectively.

After data collection components 420*a* to 420*d* are started, each collects text data and text metadata indicative of an initial state of application 410*a* to 410*d* respectively, and of any document opened as part of initiation of the respective application or subsequently. The amount of text data and text metadata collected is dependent on the configuration of the respective data collection components. Data collection components 420*a* to 420*d* are configurable, for example as to the types and amount of text data and text metadata collected. In some configurations, all text data might be collected and in others selected text only. The configuration may be set by selection of options by a user, or by feedback of information about auto-completion text selected by a user, for example. As described with reference to FIG. 1, the collecting may comprise recording letter by letter as the text is entered or by recording at timed intervals text entered since the last collection.

Each data collection component 420a to 420d communicates its collected text data and text metadata to central text matching component 430. This communication is shown as numbers 1, 2, 3 and 4 against the arrowed connectors in FIG. 4. The text data and text metadata may be communicated immediately after collection by the data collection component, or recorded in a data structure local to the data collection component and batches of text data and text metadata communicated at intervals to central text matching component 430.

Central text matching component 430 receives the communicated text data and text metadata and stores it in data structures of data store 440. Central text matching component 430 and data store 440 also comprise database software including database search engine software to allow identification of text matches.

Data collection components 420a to 420d may be initially configured differently so that, for example, data collection component 420a for word processor 410a collects all text entered by a user into a word processor document, and text metadata describing such aspects of the text as, for example, position in the document, font size, whether a title etc. Data collection component 420b for Web browser 410b might collect text from the main part only of a displayed document as downloaded from the Internet so that links and other peripheral data are not collected. Data collection component 420d for music player 410d might collect only data available as readable text, for example the track title of the currently-playing music track.

In an example, a user is entering text in to a document open in word processor 410a. The user enters some text and requests auto-completion suggestions, number 5 in FIG. 4. This may be, for example, by using a keyboard shortcut such as by pressing a key combination or dedicated key, or by selection from a menu displayed by using, for example, a keyboard shortcut or by pressing a right mouse button.

The auto-completion request so entered is communicated to central text matching component 430 which initiates the matching process for the entered text and its associated text metadata. It uses its associated database search engine to query data store 440 and produce a list of potential matches. A ranking procedure based upon comparison of text and text metadata is part of this process. In FIG. 4 this is represented for purposes of illustration as weighted ordering component 450 but it will be understood that it may be an integral part of the matching process.

Weighted ordering component 450 is configured for processing text metadata by using configuration settings comprising importance weights attached to particular types of text metadata. A comparison of the items of text metadata attached to the user-entered text with the text metadata of located potential matches is conducted. Other configuration settings comprise for example an identification of the similarity of source application or document of the potential match. Different weightings may also be applied depending on the application into which the user is entering text, so in this case weightings applicable for the word processor application 410a. A ranked list of potential matches is produced by this process. The ranked list is returned to word processor application 410a, number 6 in FIG. 4, and displayed to the user in a suitable manner as discussed previously.

If the user selects an appropriate item from the list, this text is transferred to the text entry position in the document of word processor 410a. The identity of the text selected is communicated to central text matching component 430, for example by data collection component 420a, number 7 in FIG. 4. In one embodiment, weighted ordering component 450 of central text matching component 430 may then use the selection to adjust its configuration settings. This adjustment may be, for example, to adjust weighting text metadata for similar text, or text having similar text metadata. In one embodiment, the adjustment will cause such text to be ranked more highly in future auto-completion suggestion lists.

In an embodiment, central text matching component 430 also communicates the identity of the selected matched text and associated metadata to the application which was the source of the selected text in a feedback operation. In the example illustrated, the text selected originated from a document displayed by Web browser 410b. Central text matching component 430 communicates the identity of the text selected and associated metadata to the data collection component of the source application, in this example data collection component 420b of Web browser 410b, number 8 in FIG. 4.

In one embodiment, the data collection component of the source application, in this example data collection component 420b, uses this information to adjust its data collection configuration. For example, if the selected information is from a particular type of text data, the data collection component might increase the amount of text data and metadata extracted from documents comprising similar types of text data, or the frequency with which such text data is sampled and its text data and metadata communicated to central text matching component 430.

In an embodiment, central text matching component 430 communicates the identity of the selected matched text and associated text metadata to applications other than that which provided the match. In the example of FIG. 4, this information is communicated to data collection components 420a, 420c and 420d in addition to 420b, numbers 9, 10 and 11. The information may be used by the data collection components to change their data collection configuration and so adapt their data collection strategies.

Embodiments of the invention described above provide a system and method for obtaining text data for use in a text auto-completion operation which operates across a system involving multiple software applications, and in some embodiments multiple users. Embodiments provide a central text matching component whose configuration may be changed based on the identity of text selected by users. Embodiments provide a system and method for feedback of information about the particular text selected by a user to the data collection components associated with multiple applications to cause adjustment of their data collection strategies. This feedback process provides a mechanism for more efficient collection of text data and metadata for matching, so that text data and metadata supplied to central text matching component 430 more closely aligns with text likely to be selected by a user, so that the text matching process evolves over time.

Figure 5:
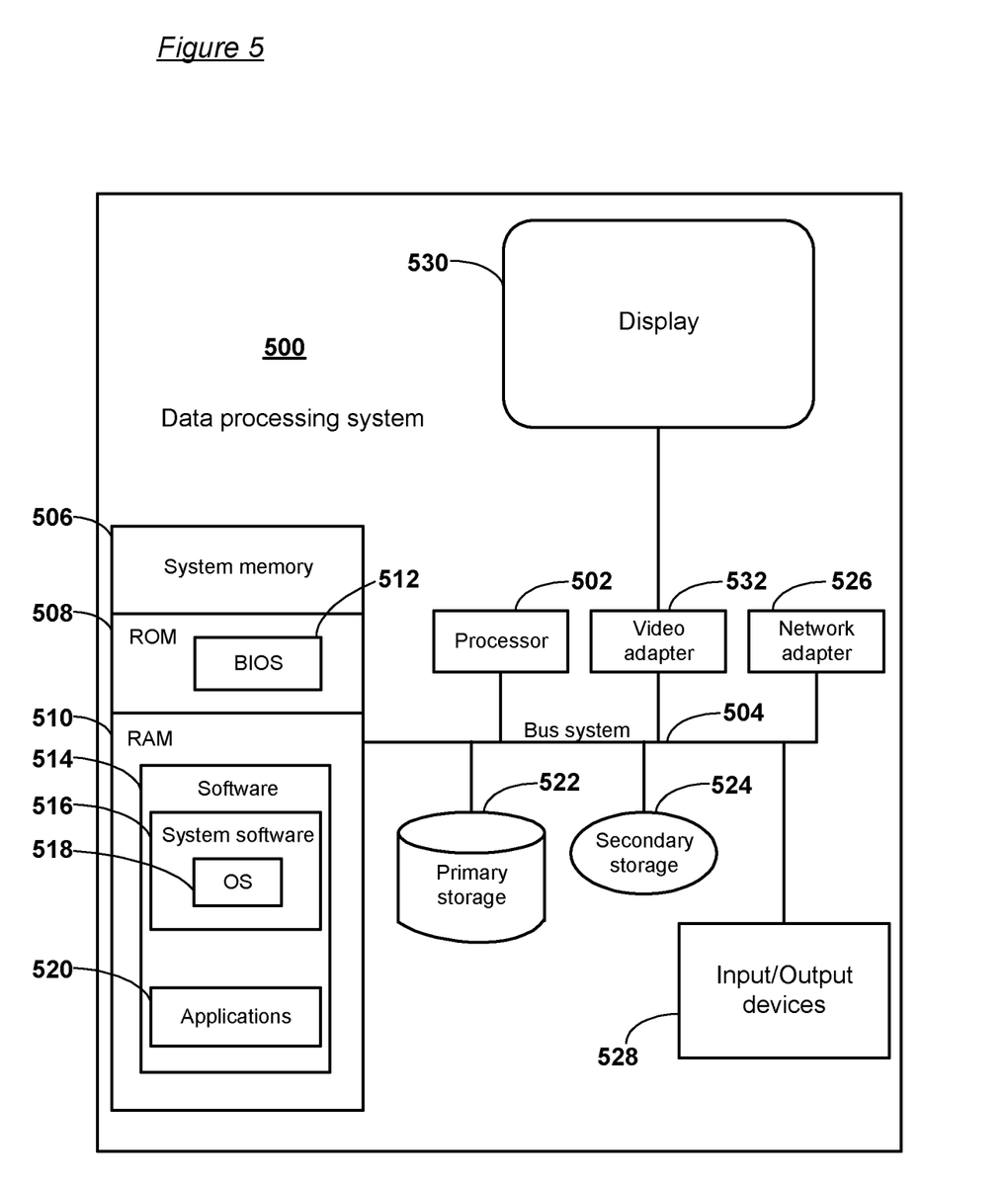
FIG. 5 illustrates an exemplary system for implementing aspects of the present invention.

FIG. 5 illustrates an exemplary system for implementing aspects of the present invention. A data processing system 500 operable for storing and/or executing program code includes at least one processor 502 coupled directly or indirectly to memory elements through a system bus 504. The memory elements may comprise local memory employed during actual execution of the program code, bulk storage memory, and cache memory for providing temporary storage of at least some program code in order to reduce the number of times program code must be retrieved from bulk storage during program execution.

Memory elements may comprise system memory 506 in the form of non-volatile read only memory (ROM) 508 and volatile random access memory (RAM) 510. A basic input/output system (BIOS) 512 may be stored in ROM 508. Software 514 may be stored in RAM 510. Software 514 may comprise system software 516, which may comprise operating system software 518, and software applications 520.

Memory elements may also comprise primary storage means 522 which may comprise a magnetic hard disc drive, and secondary storage means 524 which may comprise an optical disc drive or a magnetic disc drive. The primary and secondary storage means and their associated computer-readable storage media provide non-volatile storage of computer-executable instructions, data structures, program modules and other data for data processing system 500. Software applications may be stored on the primary and secondary storage means 522,524 as well as in system memory 506.

Data processing system 500 may operate in a networked environment using logical connections to one or more remote data processing systems via network adapter 526.

Input/output (I/O) devices 528 may be coupled to the system either directly or through intervening I/O controllers. A user may enter commands and information into system 500 through input devices such as a keyboard, pointing device such as a mouse, or other input devices such as microphone, joystick, trackball, touchpad, game controller, satellite dish, scanner etc. Output devices may comprise printers, speakers etc. Display device 530 may also be connected to system bus 504 via an interface such as video adapter 532.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A system comprising:
a memory; and
a computer processor configured with:
configurable data collection components for collecting from a plurality of software applications text data and text metadata representing an initial state of each of the software applications and text data and text metadata representing changes to the state of at least one of the plurality of software applications, wherein the text data and the text metadata collected by the configurable data collection components is selected by the configurable data collection components based on data collection settings of the configurable data collection components, wherein the data collection settings of the configurable data collection components establish what type and amount of the text data and text metadata are to be collected by the data collection components from each of the software applications;
a central text matching component for receiving from the data collection components the text data and text metadata representing an initial state and the text data and text metadata representing changes to the state of at least one of the plurality of software applications, wherein the text data and text metadata and the change text data and text metadata is stored in a database in the memory, the database maintained by the central text matching component;
a sending component for sending text entered by the user in a text-entry field of an application and any text metadata associated with said entered text to the central text matching component;
a comparison component for comparing said entered text and associated text metadata to text data and text metadata in the database and locating text strings matching the text data and metadata;
a weighted ordering component for ranking the matching text strings using the text metadata and weighted ordering component configuration settings; and
a completion component for completing the entered text at the text-entry field based on a selection of one of the located matching text strings.

2. The system of claim 1, wherein the completion component further comprises a user selection component comprising:
a display component for displaying to the user a list of text strings matching the text data and text metadata ranked by the weighted ordering component according to the text metadata and its configuration settings, and wherein a user selecting one of the matching text strings causes the completion of the entered text based on the text string selection.

3. The system of claim 1, wherein the completion component further comprises a selection component of the central text matching component for selecting the top-ranked one of the text strings matching the text data and text metadata based on weighting applied by the weighted ordering component and causing the completion of the entered text based on the text string selection.

4. The system of claim 1, wherein each of the configurable data collection components is associated with a corresponding one of the plurality of software applications.

5. The system of claim 1, wherein the computer processor is further configured with a updating component for updating text metadata of the matching text string in the database to reflect the selection.

6. The system of claim 1, wherein the type and amount of the text data and text metadata collected is configurable by a user via the data collection settings.

7. The system of claim 1, wherein the computer processor is further configured with an update component for updating the data collection settings of the configurable data collection components based on feedback received by the central text matching component of information regarding usage of the text data and text metadata in auto-completion operations, wherein updating the data collection settings based on the received feedback includes changing the type and amount of text data and text metadata that are to be collected by the data collection components in subsequent auto-completion operations.

8. The system of claim 1, wherein the text data and text metadata supplied to the central text matching component is collected by the data collection components from a plurality of users.

9. The system of claim 1, wherein the central text matching component is operable for supplying suggestions for auto-completion of text to a plurality of users.

10. A method comprising:
collecting from a plurality of software applications, via configurable data collection components of a computer processor, text data and text metadata representing an initial state of each of the software applications and supplying the text data and text metadata to a central text matching component, the central text matching component maintaining a database of the text data and text metadata, wherein the text data and the text metadata collected by the configurable data collection components is selected by the configurable data collection components based on data collection settings of the configurable data collection components, wherein the data collection settings of the configurable data collection components establish what type and amount of the text data and text metadata are to be collected by the data collection components from each of the software applications;

collecting by the configurable data collection components text data and text metadata representing changes to the state of at least one of the plurality of software applications and supplying the change text data and metadata to the central text matching component;

updating by the central text matching component the database of text data and text metadata based on the changes;

entering text by a user into a text entry field of a software application and supplying the entered text and any metadata associated with the text entry to the central text matching component;

comparing the entered text and associated text metadata to text data and text metadata in the database by the central text matching component and locating text strings matching the entered text data and metadata;

ranking the matching text strings by the weighted ordering component using the text metadata of the text strings and weighted ordering component configuration settings; and selecting one of the matching text strings and completing the entered text based on the text string selection.

11. The method of claim 10, wherein the selecting one of the matching text strings comprises:

displaying to the user a list of text strings matching the text data and text metadata ranked by the weighted ordering component according to the text metadata; and selecting by the user one of the matching text strings and completing the entered text based on the text string selection.

12. The method of claim 10, wherein the selecting one of the matching text strings comprises:

selecting by the central text matching component the top ranked one of the text strings matching the text data and text metadata based on ranking applied by the weighted ordering component; and completing the entered text based on the text string selection.

13. The method of claim 10, wherein each of the data collection components is associated with a corresponding one of the plurality of software applications.

14. The method of claim 10 further comprising:

updating text metadata of the matching text string in the database to reflect the selection.

15. The method of claim 10, wherein the type and amount of the text data and text metadata collected is configurable by a user via the data collection settings.

16. The method of claim 10 further comprising:

updating the data collection settings of the configurable data collection components based on feedback received by the central text matching component of information regarding usage of the text data and text metadata in auto-completion operations, wherein updating the data collection settings based on the received feedback includes changing the type and amount of text data and text metadata that are to be collected by the data collection components in subsequent auto-completion operations.

17. The method of claim 10, wherein the text data and text metadata supplied to the central text matching component is collected from a plurality of users.

18. The method of claim 10, wherein the central text matching component is operable for supplying suggestions for auto-completion of text to a plurality of users.

19. A computer program comprising:

a non-transitory computer readable storage medium having program code embodied therewith, the program code executable by a computer to cause the computer to perform a method comprising:

collecting by configurable data collection components from a plurality of software applications text data and text metadata representing an initial state of each of the software applications and supplying the text data and text metadata to a central text matching component, the central text matching component maintaining a database of the text data and text metadata, wherein the text data and the text metadata collected by the central text matching components is selected by the configurable data collection components based on data collection settings of the configurable data collection components, wherein the data collection settings of the configurable data collection components establish what type and amount of the text data and text metadata are to be collected by the data collection components from each of the software applications;

collecting by the configurable data collection components text data and text metadata representing changes to the state of at least one of the plurality of software applications and supplying the change text data and metadata to the central text matching component;

updating by the central text matching component the database of text data and text metadata based on the changes;

entering text by a user into a text entry field of a software application and supplying the entered text and any metadata associated with the text entry to the central text matching component;

comparing the entered text and associated text metadata to text data and text metadata in the database by the central text matching component and locating text strings matching the entered text data and metadata;

ranking the matching text strings by the weighted ordering component using the text metadata of the text strings and weighted ordering component configuration settings; and selecting one of the matching text strings and completing the entered text based on the text string selection.

20. The computer program product of claim 19, wherein the selecting one of the matching text strings comprises:

displaying to the user a list of text strings matching the text data and text metadata ranked by the weighted ordering component according to the text metadata; and selecting by the user one of the matching text strings and completing the entered text based on the text string selection.

* * * * *